United States Patent [19]
Hirose et al.

[11] Patent Number: 5,132,153
[45] Date of Patent: Jul. 21, 1992

[54] OPTICAL RECORDING MEDIA

[75] Inventors: Sumio Hirose; Shigeru Takahara; Tadashi Koike; Shin Aihara; Keiji Ueno, all of Kanagawa, Japan

[73] Assignees: Mitsui Toatsu Chemicals, Inc., Tokyo; Yamamoto Chemicals Inc., Osaka, both of Japan

[21] Appl. No.: 456,645

[22] Filed: Dec. 27, 1989

[30] Foreign Application Priority Data

Dec. 28, 1988 [JP] Japan .................. 63-329172

[51] Int. Cl.$^5$ .............................. B32B 3/02
[52] U.S. Cl. ...................... 428/64; 428/65; 428/195; 428/447; 428/913; 346/76 L; 346/135.1; 369/288; 430/945
[58] Field of Search ............ 428/64, 65, 447, 913, 428/195; 346/76 L, 135.1; 829/288; 430/270, 945

[56] References Cited

U.S. PATENT DOCUMENTS 4,622,261 11/1986 Ochiai .................. 428/195
4,873,131 10/1989 Kashima et al. .......... 428/64

FOREIGN PATENT DOCUMENTS 63-164037 7/1988 Japan .

Primary Examiner—Bruce H. Hess
Assistant Examiner—Elizabeth Evans
Attorney, Agent, or Firm—Millen, White & Zelano

[57] ABSTRACT

Disclosed are optical recording media, each of which is composed of a substrate and a recording layer formed on the substrate. The recording layer includes an organic-dye-containing layer and an organopolysiloxane resin layer formed by the condensation of a trifunctional silane represented by $R^1Si(Or^2)_{3-n}(X)_n$ and a tetrafunctional silane represented by $Si(OR^3)_{4-m}(X)_m$, wherein $R^1$, $R^2$ and $R^3$ individually represent an alkyl or aryl group, X a hydroxyl group or a halogen atom, and n and m 0, 1, 2 or 3 and 0, 1, 2, 3 or 4, respectively.

7 Claims, 3 Drawing Sheets

OPTICAL RECORDING MEDIA

BACKGROUND OF THE INVENTION a) Field of the Invention

The present invention relates to optical recording media which permit writing once with a convergent beam of a laser, especially a semiconductor laser, and more specifically to recording media useful for external memories of computers and for recording various information such as video and audio information. The present invention is also concerned with a process for the production of optical recording media.

b) Description of the Related Art

Recording media bearing an inorganic recording layer formed of a thin film of a low-melting-point metal such as tellurium, a tellurium alloy or a bismuth alloy have heretofore been proposed as write-once optical recording media. Some of these conventional recording media have already been used actually.

In recording media having a thin layer of such a low-melting-point metal as a recording layer, the formation of the recording layer is conducted by a vacuum process such as vacuum evaporation, sputtering or ion plating. These film-forming processes however do not permit easy control of the thickness, composition, etc. of a recording layer, so that they involve problems in productivity and yield. Moreover, recording media having as a recording layer a thin film of such a low-melting-point metal are accompanied by another drawback that thermal energy produced by a laser beam irradiated upon recording of signals is caused to dissipate through the thin metal film because the thermal conductivity of the recording layer is high. As a result, irradiated energy cannot be used effectively for the recording of signals, resulting in reduced recording sensitivity, excessively large record pits and irregular pit size. There is hence a limit to the recording density. Further, metals used in recording layers, such as tellurium, are prone to oxidation and are not fully reliable in durability and moreover, have toxicity and are dangerous.

Optical recording media making use of an organic dye as a recording layer have also been proposed. With these recording media, improved productivity, recording sensitivity and recording density are feasible since an organic dye can be easily formed into a film by a coating method such as spin coating and moreover generally has a lower thermal conductivity compared to metals.

Recording media which contain as a recording layer an organic dye having an absorption in a semiconductor laser range have also been developed. Examples of such an organic dye include dithiol metal complexes, polymethine dyes, squarylium dyes, naphthoquinone dyes, phthalocyanine dyes, and naphthalocyanine dyes. Some of these recording media have found practical utility.

The optical recording media proposed to date, which contain an organic dye as a recording layer, are however accompanied by the drawbacks that blisters may occur at edges of pits upon recording (rim formation) or the quality (CN ratio) of recorded signals may be lowered due to the formation of decomposition products and they may not be suited for applications where a high CN ratio is required, for example, for analog signals. They may not be able to give large reading-out power because the threshold upon recording is not sharp.

Japanese Patent Laid-Open No. 164037/1988 discloses a recording medium capable of suppressing the formation of rims and/or the occurrence of decomposition products, in which an overcoat layer composed of an organopolysiloxane formed by the condensation of phenyltriethoxysilane and methyltriethoxysilane is provided on an organic dye layer and recording is performed by the formation of bubbles. As will be demonstrated subsequently in Comparative Example 1, the noise-to-signal ratio (CN ratio) of this recording medium tends to decrease when recorded under an excessive laser power (i.e., over-power), so that it is impossible to set large the margin of the recording laser power. When recording is performed in a mode of a constant angular velocity, the linear velocity varies depending on the radial distance from the center of the recording medium so that the recording laser power must be precisely controlled to always maintain it at an optimal level. The CN ratio is lowered by variations in laser power upon recording. Further, when recording is performed by the mark-length recording method which is a high-density recording method, good CN ratios can be obtained when pit lengths are short but cannot be achieved when pit lengths are long.

SUMMARY OF THE INVENTION

An object of this invention is to solve the drawbacks observed on the conventional optical recording media while retaining the high productivity which is the merit of optical recording media having one or more of the above-described organic dyes as a recording layer, thereby providing optical recording media which permit a large margin for the laser power upon recording, retain a high CN ratio even when long pits are formed, and give high reading-out power while having high sensitivity.

With the foregoing in view, the present inventors have proceeded with an extensive investigation. As a result, it has been found that the below-described optical recording medium has a high CN ratio unavailable from conventional optical recording media having an organic dye as a recording layer and has excellent stability to reading-out light because of a sharp recording threshold:

An optical recording medium formed substantially of a transparent substrate without any reflective layer and a recording layer provided on the substrate so that recording of signals by the formation of bubbles and reading-out of recorded signals can be selectively performed by irradiating laser beam from the side of the transparent substrate, characterized in that the recording layer comprises:

a layer comprising an organic dye therein; and an organopolysiloxane resin layer formed by the condensation of a trifunctional silane represented by $R^1Si(OR^2)_{3-n}(X)_n$ and a tetrafunctional silane represented by $Si(OR^3)_{4-m}(X)_m$, wherein $R^1$, $R^2$ and $R^3$ individually represent an alkyl or aryl group, X a hydroxyl group or a halogen atom, and n and m 0, 1, 2 or 3 and 0, 1, 2, 3 or 4, respectively.

The optical recording medium according to the invention has, as a recording layer, a layer of the specific organic dye and another layer of the condensed organopolysiloxane resin, so that the recording layer itself has sufficient reflectivity to semiconductor laser beams and without the need for additional provision of a reflective layer unlike conventional recording media, can give a high CN ratio even when recording is conducted in the form of pits of various lengths, develops no reduction in CN ratio even when the laser power is increased, and has excellent stability to the reading-out light because of better threshold characteristics although it has higher sensitivity than the conventional recording media.

DETAILED DESCRIPTION OF THE PREFERRED EMBODIMENTS

Figure 1:
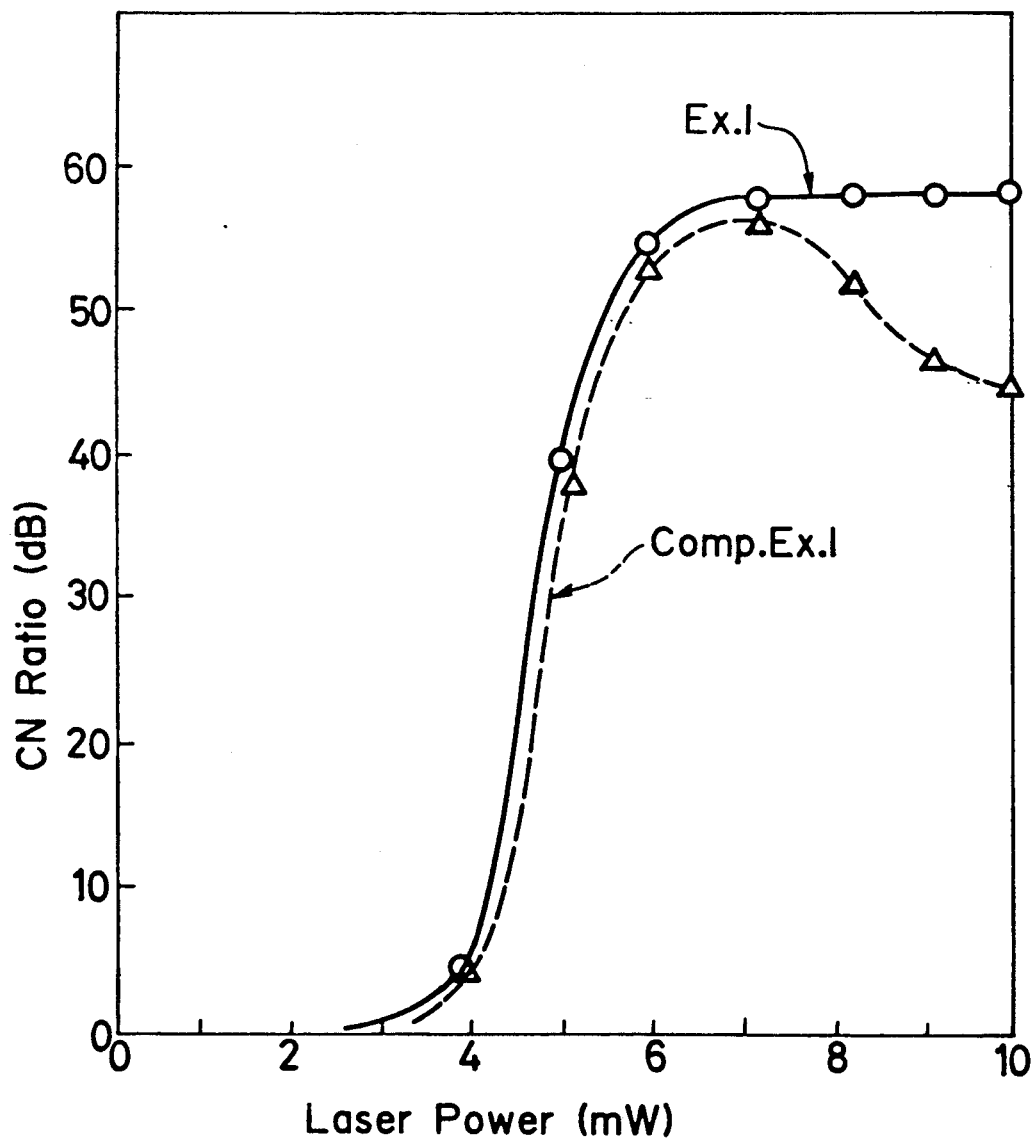
FIG. 1 diagrammatically shows the relation between writing laser power and CN ratio of the media of Example 1 and Comparative Example 1.

As the transparent substrate usable in the optical recording medium of the invention, it is preferable to employ a substrate having a light transmittance of at least 85% and small optical anisotropy. Specific examples of a suitable material include plastics such as acrylic resins, polycarbonate resins, allyl resins, polyester resins, polyamide resins, vinyl chloride resins, polyvinyl ester resins, epoxy resins, and polyolefin resins; and glass. Plastics are particularly preferred from the standpoints of mechanical strength, ease in the formation of a pregroove and the application of address signals, and economy.

The shape of the substrate may be in the form of either a plate or a film or in the form of a disk or a card. Needless to say, the substrate may contain in the surface thereof a pregroove indicative of the position of recording and pits for address signals and the like. Such pregroove and address signal pits can be formed upon production of a substrate by injection molding or casting molding. Or they can be formed by coating a u.v. curable resin on a substrate, superposing a stamper on the coated side of the substrate and then exposing the same to ultraviolet rays.

In the invention, the optical recording medium is practically constructed of a recording layer provided on such a substrate. The recording layer is composed of a layer containing an organic dye and another layer of a condensed organopolysiloxane resin.

Organic dyes usable in the optical recording medium of the invention are those having both absorption and reflection in the oscillation wavelength range of a semiconductor laser. Described specifically, exemplary usable organic dyes include aromatic or unsaturated aliphatic dithiol metal complex dyes, aromatic or unsaturated aliphatic diamine metal complex dyes, polymethine dyes, squarylium dyes, azulene dyes, naphthoquinone dyes, anthraquinone dyes, large cyclic aza-annulene dyes, quinonoid dyes, etc. Large cyclic aza-annulene dyes are particularly preferred because of their solubility in solvents used to coat dyes, their durability when formed into optical recording media, and their stability to reading-out light, etc. Typical examples of large cyclic aza-annulene dyes include porphyrin dyes, phthalocyanine dyes and naphthalocyanine dyes. Described more specifically, substituted porphyrins such as tetraphenylporphyrin, tetrabutylporphyrin and tetraoctylporphyrin; and substituted phthalocyanines, substituted phthalonaphthalocyanine and substituted naphthalocyanines, represented by the below-described formula (1), may be mentioned.

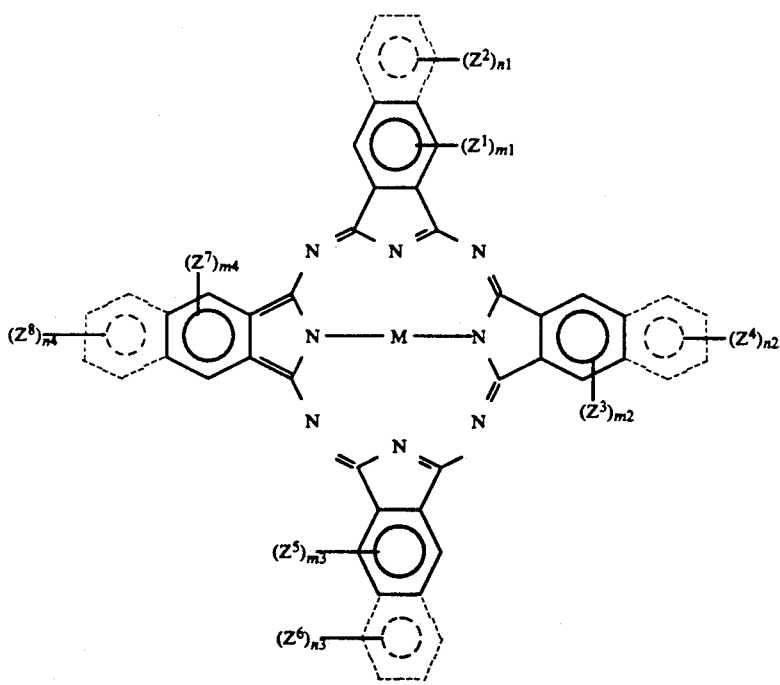

(1)

wherein $Z^1$, $Z^2$, $Z^3$, $Z^4$, $Z^5$, $Z^6$, $Z^7$ and $Z^8$ individually represent an alkyl group such as a butyl, octyl or dodecyl group, an aryl group such as a phenyl, butylphenyl or naphthyl group, an alkoxyl group such as butoxy, hexyloxy, octyloxy or dodecyloxy group, an aryloxy group such as a phenoxy, butylphenoxy or naphthyloxy group, an alkylthio group such as a butylthio, hexylthio, octylthio or dodecylthio group, an arylthio group such as a phenylthio, butylphenylthio or naphthylthio group, a silyl group such as a trimethylsilyl, tributylsilyl or triphenylsilyl group, an alkylamido group, or a halogen atom such as a chlorine or bromine atom; M represents two hydrogen atoms, a divalent metal such as Cu, Ni, Pd, Pt, Zn, Cd, Mg or Ba, a trivalent metal compound such as Al—Cl, Ga—Cl or In—Cl, or a tetravalent metal compound such as a tetravalent metal oxide or halide, e.g., VO, SiO, TiO, SnO, NbO, SiCl$_2$, TiCl$_2$ or SnCl$_2$, a trialkylsiloxy-substituted silicone or a trialkylsiloxy-substituted titanium; and n1, n2, n3, n4, m1, m2, m3 and m4 individually represent an integer of 0–4.

Described more specifically, may be mentioned alkyl-substituted phthalocyanines, naphthalocyanines and phthalonaphthalocyanines such as copper-octahexylphthalocyanine, vanadyl-tetradodecylphthalocyanine, vanadyl-tetraoctylnaphthalocyanine and vanadyl-tetraoctylphthalonaphthalocyanine; alkoxy-substituted phthalocyanines, naphthalocyanines and phthalonaphthalocyanines such as vanadyl-tetrabutoxyphthalocyanine, nickeloctadodecyloxyphthalocyanine and vanadyl-tetraoctyloxynaphthalocyanine; alkylthio-substituted phthalocyanines and naphthalocyanines such as copper-octahexylthiophthalocyanine and chloroaluminum-tetraoctylthionaphthalocyanine; arylthio-substituted phthalocyanines and naphthalocyanines such as palladium-octaphenylthiophthalocyanine, vanadyl-dodecylbutylphenylthiotetrachlorophthalocyanine and copper-tetrabutylpheny thionaphthalocyanine; silyl-substituted phthalocyanines and naphthalocyanines such as vanadyl-tetratriphenylsilylphthalocyanine and dichlorotitanyl-tetratrimethylsilylnaphthalocyanine; and bistrihexylsiloxy-silicone naphthalocyanin.

On the other hand, resins usable for the formation of the condensed organopolysiloxane resin layer useful in the practice of the invention are organopolysiloxane resins obtained by condensing a trifunctional silane represented by R$^1$Si(OR$^2$)$_{3-n}$(X)$_n$ and a tetrafunctional silane represented by Si(OR$^3$)$_{4-m}$(X)$_m$, wherein R$^1$, R$^2$ and R$^3$ individually represent an alkyl or aryl group, X represents a hydroxyl group or a halogen atom, and n and m represent 0, 1, 2 or 3 and 0, 1, 2, 3 or 4, respectively. Specific examples of R$^1$, R$^2$ and R$^3$ include alkyl groups such as methyl, ethyl, propyl, butyl, hexyl, octyl and cyclohexyl groups; and aryl groups such as phenyl, methylphenyl, naphthyl and benzyl groups. Further, specific exemplary halogen atoms include chlorine, bromine and iodine atoms. These substituents may be of the same kind or of different kinds in each molecule.

More specific examples of the trifunctional and tetrafunctional silane compounds employed in the formation of the organopolysiloxane resin include trifunctional silane compounds such as methyltrimethoxysilane, methyltriethoxysilane, methyltributoxysilane, ethyltrimethoxysilane, ethyltriethoxysilane, butyltriethoxysilane, butyltributoxysilane, phenyltrimethoxysilane, phenyltriethoxysilane, phenyltriphenoxysilane, naphthyltrimethoxysilane, methylhydroxydimethoxysilane, ethylhydroxydimethoxysilane, phenylhydroxydiphenoxysilane, and methyldihydroxymethoxysilane; and tetrafunctional silane compounds such as tetramethoxysilane, tetraethoxysilane, tetrabutoxysilane, tetraphenoxysilane, hydroxytrimethoxysilane, hydroxytriethoxysilane and dihydroxydimethoxysilane.

These trifunctional and tetrafunctional silanes can be used either singly or in combination.

In the present invention, a thermoplastic resin may be contained in the organopolysiloxane resin. Usable thermoplastic resins are those compatible with the above-exemplified trifunctional silanes and tetrafunctional silanes and after condensation, capable of forming uniform organopolysiloxane resin films. Specific exemplary thermoplastic resins include homopolymers and copolymers of vinyl esters such as vinyl acetate, vinyl propionate, vinyl butyrate, vinyl decanecarboxylate and vinyl stearate; partially saponified polymers of these polymers; polyvinyl alcohol; formal polymers, acetal polymers and butyral polymers of polyvinyl alcohol; copolymer resins of vinyl acetate and vinyl monomers such as acrylate esters; homopolymer and copolymer resins of hydroxyalkyl (meth)acrylates; acrylamide resins; homopolymer and copolymer resins of ethylene oxide and propylene oxide; polycaprolactone; etc. These thermoplastic resins may be either reactive or non-reactive with the aforementioned trifunctional silanes and tetrafunctional silanes or with precondensed resins of the former trifunctional silanes and tetrafunctional silanes.

To form a recording layer by coating, a dye solution formed of the above-described organic dye and an organic solvent is brought into contact with a substrate to form an organic dye layer on the substrate. This can be achieved, for example, by causing the dye solution to flow down onto the substrate or bringing one side of the substrate into contact with the surface of the dye solution and pulling up the substrate, and then spinning the substrate to remove any extra portion of the dye solution, or by dropping the dye solution onto the substrate while spinning the same. If necessary, the thus-formed organic dye layer may be subjected to drying after the coating step. A resin solution of the aforementioned trifunctional silane and tetrafunctional silane or the aforementioned trifunctional silane, tetrafunctional silane and thermoplastic resin is then similarly coated onto the organic dye layer, whereby a condensed organopolysiloxane resin layer can be formed. Here again, drying can of course be applied as needed. Although the trifunctional silane and tetrafunctional silane may be used as they are, it is preferable from the standpoints of easier film formation and shortening of the condensing time to us the trifunctional silane and tetrafunctional silane after precondensing them, for example, at a temperature of from room temperature to 100° C. for about 30 minutes to about 10 hours. Upon precondensation, the above-mentioned thermoplastic resin can be added before the precondensation. As an alternative, only the silane compounds can be precondensed, followed by the addition of the thermoplastic resin. The above-described silane or precondensed resin turns to a three-dimensionally crosslinked organopolysiloxane resin temperature but not higher than 100° C. for 30 minutes to 50 hours. Here, an amine, metal oxide or metal alkoxide catalyst or an acid catalyst may be added to facilitate the condensation reaction.

In order to make possible the use of a large margin of laser power upon recording, to retain a high CN ratio even when long pits are formed, and to have stability to reading-out light while having high sensitivity, the thickness of the condensed organopolysiloxane resin layer should be 200 nm or less, with 200–30 nm being preferred. Thickness greater than 200 nm is not preferred because the sensitivity will be reduced. On the other hand, thickness smaller than 30 nm cannot give a large margin to the laser power upon recording and is inferior in the stability to reading-out light.

As to the composition of the organopolysiloxane resin layer, it is preferable to use the trifunctional silane, tetrafunctional silane and thermoplastic resin in proportions of 40–80 wt. %, 10–50 wt. % and 0–20 wt. %, respectively. More preferably, it is desirable to use them in proportions of 50–70 wt. %, 20–40 wt. % and 0–15 wt. %, respectively. If the proportion of the trifunctional silane exceeds 80 wt. % or if the proportion of the tetrafunctional silane is less than 10 wt. % or if the proportion of the thermoplastic resin is in excess of 20 wt. %, recording with overpower leads to such problems that the CN ratio tends to decrease, the margin for the recording laser power becomes smaller, the sizes of recorded pits become irregular (increased jitter), and the stability to reading-out light is not improved. On the other hand, if the proportion of the trifunctional silane is less than 40 wt. % or the proportion of the tetrafunctional silane exceeds 50 wt. %, the sensitivity is reduced, deformations occur in recorded pits, and more jitter takes place. Therefore, proportions outside the above-specified corresponding ranges are not preferred.

When a thermoplastic resin is used, its proportion may range from 0.001 wt. % to 20 wt. %. When substantially no thermoplastic resin is used, its proportion ranges from 0 wt. % to 0.001 wt. %.

On the other hand, the thickness of the organic-dye-containing layer preferably is 50–200 nm from the viewpoint of sensitivity and also from the standpoint that a large quantity of reflected light is available upon irradiation of a laser through the substrate.

Illustrative of the solvent which is employed to dissolve the organic dye and the silanes or the precondensed resin thereof upon formation of a recording layer in the invention include aromatic hydrocarbons such as benzene, toluene, xylene and ethylbenzene; linear aliphatic hydrocarbons such as hexane, heptane, octane and decane; cyclic aliphatic hydrocarbons such as cyclohexane and methylcyclohexane; ketones such as acetone, methyl ethyl ketone, methyl isobutyl ketone, cyclohexanone and acetylacetone; esters such as ethyl acetate, butyl acetate, amyl acetate and cellosolve acetate; alcohols such as methyl alcohol, ethyl alcohol, isopropyl alcohol, allyl alcohol, methyl cellosolve, ethyl cellosolve, butyl cellosolve and benzyl alcohol; linear ethers such as diethyl ether, dibutyl ether and diisopropyl ether; cyclic ethers such as tetrahydrofuran, dioxane and diglyme; chlorinated hydrocarbons such as carbon tetrachloride, chloroform, trichloroethylene, dichloroethane, trichloroethane and tetrachloroethane fluorinated hydrocarbon solvents; dimethylformamide; carbon disulfide; etc.

When making a selection of the solvent, it is preferable to choose a solvent which has solubility to the organic dye and the silanes or the precondensed resin thereof and needless to say, does not damage the pregroove, prepits and the like in the substrate and also the organic dye. Taking these requirements into consideration, linear aliphatic hydrocarbons and linear ether solvents may be mentioned as solvents preferred for use in the formation of the organic dye layer, and alcoholic solvents are preferred for the formation of the condensed organic polysiloxane resin layer. The concentration of the dye in the dye solution used for the coating varies depending on the kind of the solvent and the coating method. In general, it may range from about 0.1 wt. % to about 10 wt. %.

To enhance the smoothness of the recording layer or to reduce defects such as pinholes and cracks, a resin such as nitrocellulose, ethylcellulose, an acrylic resin or polystyrene resin and additives such as a leveling agent and a defoaming agent can also be employed in the formation of the recording layer. The addition of these resin and additives in large amounts in the formation of the organic dye layer however causes a potential problem such that the organic dye layer has a reduced reflectivity or contains the dye in a dispersed state. These additional components or additives may therefore be added in a total amount not greater than 20 wt. %, preferably not greater than 10 wt. %, more preferably not greater than 5 wt. %.

Additives such as a leveling agent and a defoaming agents may also be added in formation of the organopolysiloxane resin layer. It is also possible to add a dye, which can be dissolved in the organopolysiloxane resin, in order to increase the reflectivity and sensitivity of the recording layer.

As has been described above, it is preferable for the optical recording medium of this invention to conduct recording or reading-out of signals by means of a laser beam through the substrate, in other words, a laser beam irradiated from the side of the substrate.

Principal features of the invention reside in that owing to the superposition of the specific condensed organopolysiloxane layer on the particular organic dye layer, high reflectivity and the sharp threshold characteristics have been achieved, and the CN ratio is not lowered and pits of various lengths can be recorded accurately while maintaining a high CN ratio even when high power is used.

Upon provision of optical recording media according to the invention for actual use, with a view toward protecting the recording layer medium, a protective sheet may be applied to the surface of the recording layer of medium or two optical recording media may be bonded together with the surfaces of their respective recording layers located inside. In these cases, it is desirable to bond them so as to make an air gap or a buffer layer on each recording layer.

As the laser beam employed for the recording and reading-out of signals in the optical recording medium of this invention, a semiconductor laser having an oscillation wavelength of 640–850 nm is generally preferred. When recording is conducted, for example, at a linear velocity of 11 m/sec, it is desirable to control the laser power within a range of about 5–12 mW on the recording layer. Upon reading-out, it is suitable to maintain the laser power at a level about 1/10 to 1/5 of the laser power employed upon recording.

EXAMPLE 1

A 3 wt. % solution of vanadyl-tetraoctylnaphthalocyanine dye in dibutyl ether was added dropwise onto a central portion of the pregroove-containing surface of an injection-molded polycarbonate resin substrate Which had a thickness of 1.2 mm and a diameter of 130 mm and contained a spiral pregroove of 70 nm deep, 0.6 $\mu$m wide and 1.6 $\mu$m pitch. The resin substrate was then spun at 1,000 rpm for 10 seconds. Thereafter, the substrate was dried for 10 minutes in an atmosphere of 40° C., whereby a dye layer was formed. A 1 wt. % methyl cellosolve solution of a resin consisting of 9 parts of a resin, (which had been obtained by precondensing 70 wt. % of methyltrimethoxysilane and 30 wt. % of tetramethoxysilane and had an average molecular weight of 500) and 1 part of vinyl acetate resin, was spin-coated on the dye layer in the same manner as in the formation of the dye layer, whereby an organopolysiloxane resin layer was formed on the dye layer and a recording layer was hence formed. Thereafter, the substrate was heated at 80° C. for 1 hour to allow the organopolysiloxane resin to undergo condensation. According to microscopic thickness measurement of a cross-section of the recording layer, the thicknesses of the organic dye layer and organopolysiloxane resin layer were about 90 nm and about 70 nm, respectively. The reflectively of the recording layer to light of 830 nm wavelength irradiated through the resin substrate was 25%.

Two resin substrates which carried a recording layer formed thereon as described above were laminated together with the recording layers located inside and with an air gap of 500 || m interposed therebetween, so that an optical recording medium was produced.

Figure 2:
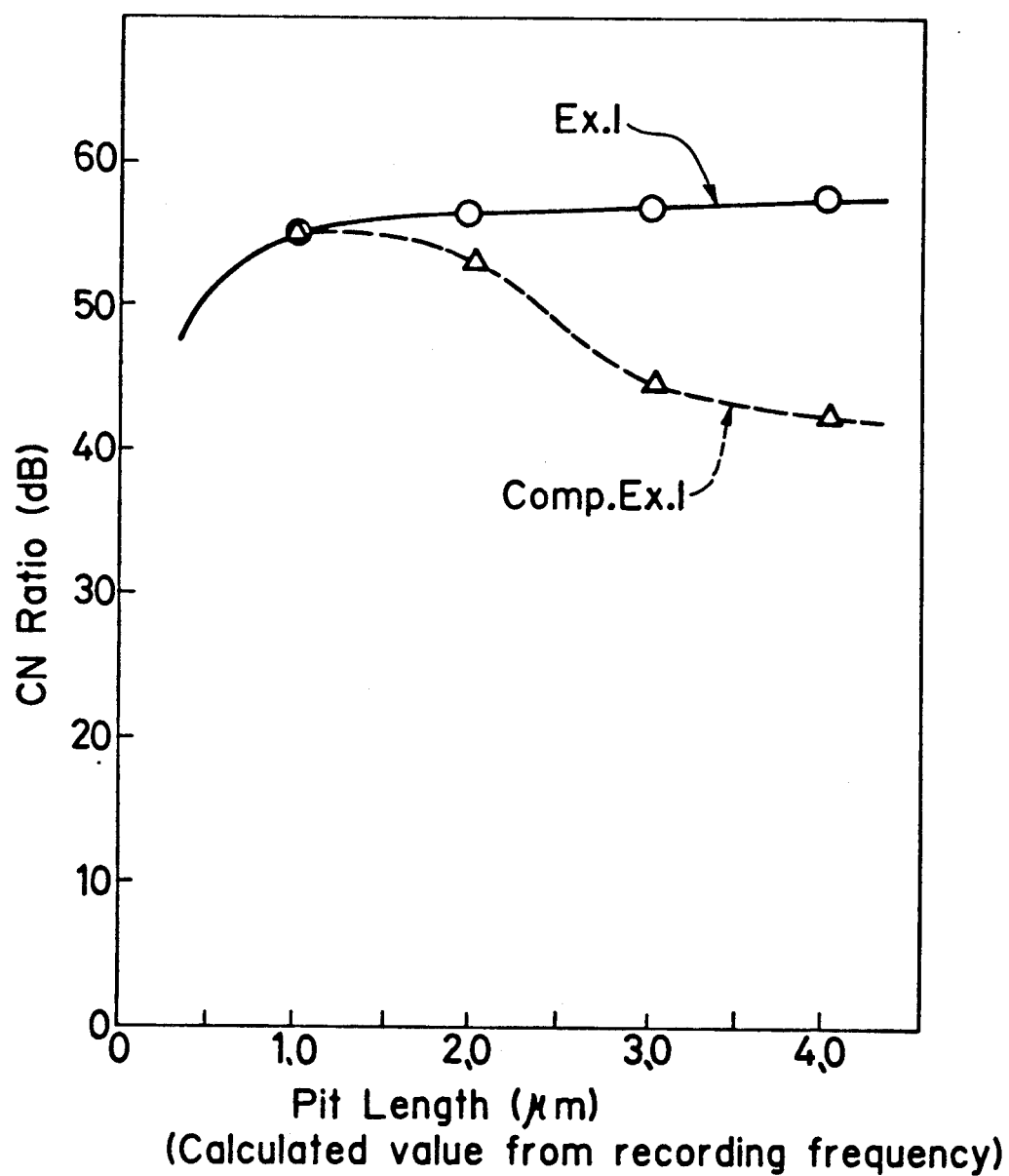
FIG. 2 diagrammatically illustrates the relation between written pit length and CN ratio of the media of Example 1 and Comparative Example 1.

The recording medium was mounted on a turn table and while rotating the same at the speed of 1,800 rpm, 3.7 MHz pulse signals (pulse interval: 90 ns) were recorded at an outermost area of the medium by means of a drive having an optical head with a semiconductor laser of 830 nm oscillation wavelength mounted thereon while controlling the drive to focus a laser beam on the recording layer on the pregroove through the resin substrate and changing the laser power on the recording surface. Using the same apparatus, reading-out of signals recorded while controlling the power of the semiconductor laser at 1 mW on the recording surface was performed. Relation between writing laser power and CN ratio of the medium is shown in FIG. 1. To investigate the stability of the recording layer to reading-out light, the recorded signals were repeatedly and continuously read-out by irradiating the same track 1,000,000 times with reading-out light of 1.5 mW. No change was observed at all in the amplitude of the recorded signals and the CN ratio. Further, using the same medium, pits of various lengths were recorded at 8 mW and 50% duty factor by changing the recording frequency. CN ratios of reading-out signals thus recorded are shown in FIG. 2.

COMPARATIVE EXAMPLE 1

A medium was produced and evaluated in a similar manner to Example 1 except that an organopolysiloxane layer in which the mixing molar ratio of phenyltriethoxysilane to methyltriethoxysilane was 4:1 was superposed instead of the organopolysiloxane resin layer of Example 1. The results are shown in FIG. 1 and FIG. 2.

EXAMPLE 2

A medium was produced and evaluated in a similar manner to Example 1 except that the organic dye and organopolysiloxane resin shown in Table 1 were coated in lieu of the organic dye and organopolysiloxane resin employed in Example 1. Like the medium of Example 1, the medium thus obtained gave a high CN ratio and no CN ratio reduction was observed even when the laser power was increased. Further, the stability to the reading-out light was also good.

TABLE 1

| Run | Organic dye | Organopolysiloxane resin | |
|---|---|---|---|
| 1 | Vanadyl-tetraoctyl-substituted naphthalocyanine | Phenyltrimethoxysilane<br>Tetramethoxysilane<br>Vinyl acetate resin | 65 wt. %<br>27 wt. %<br>8 wt. % |
| 2 | Vanadylphthalocyanine substituted with 12 butylphenylthio groups and 4 chlorine atoms | Methyltrimethoxysilane<br>Tetraphenoxysilane<br>Vinyl acetate resin | 50 wt. %<br>35 wt. %<br>15 wt. % |
| 3 | Bis(trihexyloxy)-silicon-naphthalocyanine | Methyltriethoxysilane<br>Tetraethoxysilane | 70 wt. %<br>30 wt. % |
| 4 | Vanadyl-tetraoctyl-substituted phthalonaphthalocyanine* | Phenyltriphenoxysilane<br>Tetramethoxysilane<br>Acrylic resin** | 70 wt. %<br>20 wt. %<br>10 wt. % |

*Compound with 3 octyl-substituted naphthalene rings and 1 octyl-substituted benzene ring. Evaluated by means of the drive with a laser of 780 nm oscillation wavelength mounted thereon.
**Copolymer resin formed of 50 wt. % of hydroxyethyl methacrylate and 50 wt. % of methyl acrylate.

EXAMPLE 3 & COMPARATIVE EXAMPLES 2-3

In a similar manner to Example 1, media were produced using the organic dye and organopolysiloxane resin which were employed in Run 1 of Example 2, and controlling the thickness of organopolysiloxane resin-layer to 0 nm, 20 nm, 50 nm, 170 nm and 250 nm, respectively. Their recording sensitivity upon recording of 3 μm pits and the stability to reading-out light were measured.

Figure 3:
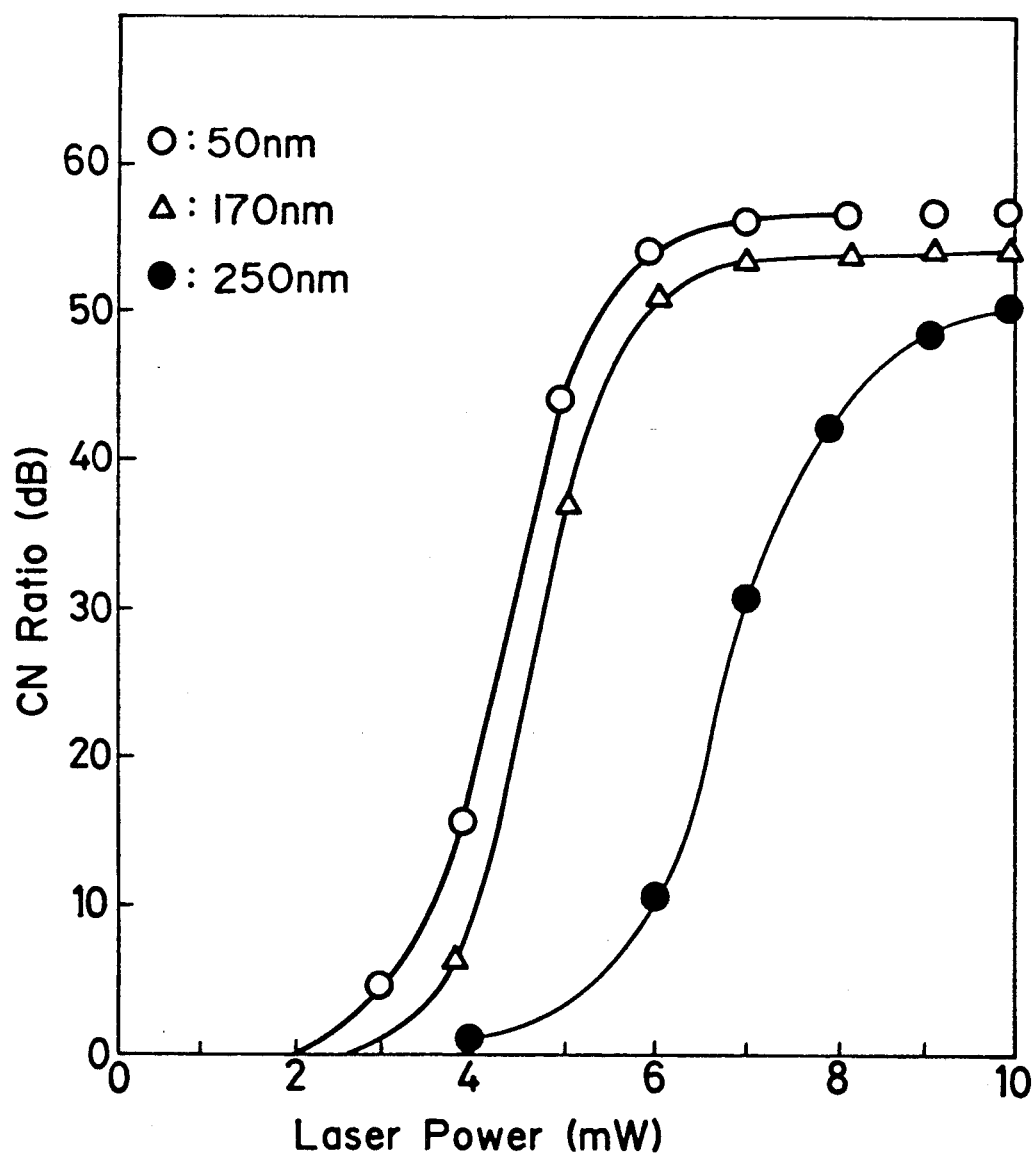
FIG. 3 diagrammatically depicts the relation between writing laser power and CN ratio of various film thicknesses.

The media whose organopolysiloxane resins layers were 0 nm and 20 nm thick, respectively, gave CN ratios as low as 42 dB and lower, and the stability to reading-out light was so poor that signal deteriorations were observed after the signals were read out continuously 500–1,000 times. The results of the recording on the media whose organopolysiloxane resin layers were 50 nm, 170 nm and 250 nm, respectively, are diagrammatically shown in FIG. 3. A reduction in recording sensitivity was observed from the medium whose organopolysiloxane resin layer had the thickness of 250 nm, but the media whose organopolysiloxane resin layers had the thicknesses of 50 nm and 170 nm, respectively, had high sensitivity and gave CN ratios of 50 dB and higher. Further, no problem was observed as to the stability to reading-out light.

I claim:

1. In an optical recording medium formed substantially of a transparent substrate and a recording layer provided on the substrate so that recording of signals by the formation of bubbles and reading-out of recorded signals can be selectively performed by an irradiating laser beam from the transparent substrate side, the improvement wherein the recording layer comprises:
   (a) an organic dye layer formed on the substrate comprising an organic dye; and
   (b) an organopolyusiloxane resin layer covering said dye layer, wherein the organopolysiloxane resin is formed by the condensation of a trifunctional silane represented by $R^1Si(OR_2)3-n(X)_n$ and a tetrafunctional silane represented by $Si(OR^3)4-m(X)_m$, wherein $R^1$, $R^2$ and $R^3$ individually represent an alkyl or aryl group, X a hydroxyl group or a halogen atom, and n and m 0, 1, 2 or 3 and 0, 1, 2, 3 or 4, respectively, whereby a high CN ratio is obtained even when recording thereon in the form of pits of vary length and whereby no reduction in CN ratio occurs when the laser power is increased.

2. The optical recording medium of claim 1, wherein the organopolysiloxane resin contains a thermoplastic resin.

3. The optical recording medium of claim 1, wherein the organopolysiloxane resin comprises 40–80 wt. % of the trifunctional silane, 10–50 wt. % of the tetrafunctional silane and 0–20 wt. % of a thermoplastic resin.

4. The optical recording medium of claim 1, wherein the organic dye is a large cyclic aza-annulene dye.

5. The optical recording medium of claim 4, wherein the large cyclic aza-annulene is a compound represented by the following formula (1):

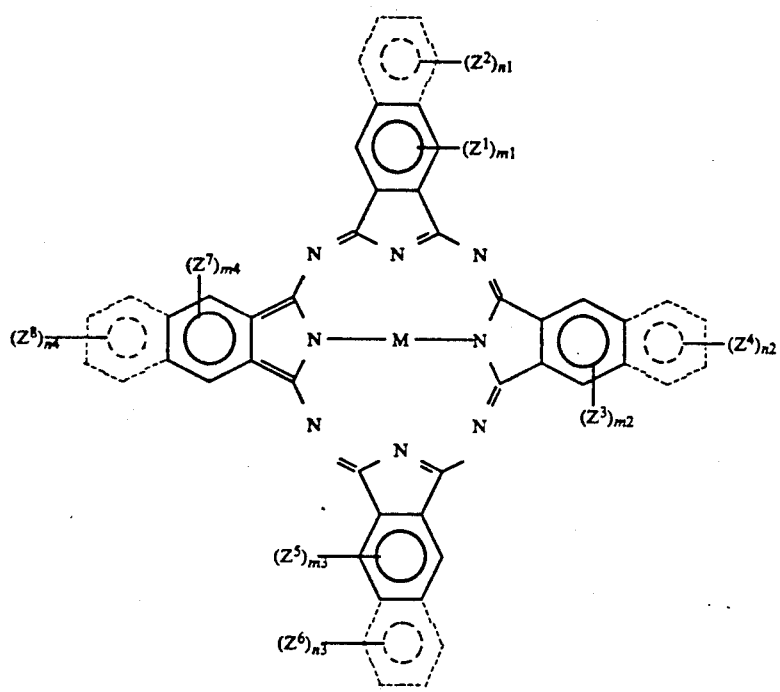

(1)

wherein $Z^1$, $Z^2$, $Z^3$, $Z^4$, $Z^5$, $Z^6$, $Z^7$ and $Z^8$ individually represent an alkyl, aryl, alkoxyl, aryloxy, alkylthio, arylthio, silyl or alkylamido group or a halogen atom, M two hydrogen atoms, a divalent metal or a trivalent or tetravalent metal compound, and n1, n2, n3, n4, m1, m2, m3 and m4 individually an integer of 0–4.

6. The optical recording medium of claim 1, wherein the organosiloxane resin layer has a thickness not greater than 200 nm.

7. The optical recording medium of claim 1, wherein the organopolysiloxane resin comprises 40–80 wt. % of the trifunctional silane, 10–50 wt. % of the tetrafunctional silane and 0–20 wt. % of a thermoplastic resin; wherein the organic dye is a large cyclic aza-annulene dye; and wherein the organopolysiloxane resin layer has a thickness not greater than 200 nm.

* * * * *